United States Patent [19]
Silver et al.

[11] Patent Number: 6,003,050
[45] Date of Patent: Dec. 14, 1999

[54] METHOD FOR INTEGRATING A VIRTUAL MACHINE WITH INPUT METHOD EDITORS

[75] Inventors: David M. Silver; Yung-Shin Lin, both of Redmond, Wash.

[73] Assignee: Microsoft Corporation, Redmond, Wash.

[21] Appl. No.: 09/021,089

[22] Filed: Feb. 10, 1998

Related U.S. Application Data

[63] Continuation-in-part of application No. 08/831,975, Apr. 2, 1997, abandoned.

[51] Int. Cl.⁶ ..................................................... G06F 17/20
[52] U.S. Cl. ............................... 707/536; 707/535; 704/8
[58] Field of Search ........................... 345/192; 395/792, 395/650; 707/500, 535, 536; 364/419, 200, 900; 704/8

[56] References Cited

U.S. PATENT DOCUMENTS

| | | | |
|---|---|---|---|
| 4,327,421 | 4/1982 | Wang | 707/535 |
| 5,321,801 | 6/1994 | Ando | 395/145 |
| 5,511,193 | 4/1996 | Tung et al. | 709/302 |
| 5,535,119 | 7/1996 | Ito et al. | 364/419.03 |
| 5,634,066 | 5/1997 | Takehara et al. | |
| 5,634,134 | 5/1997 | Kumai et al. | 395/798 |
| 5,659,769 | 8/1997 | Kida et al. | 707/530 |
| 5,787,452 | 7/1998 | McKenna | 707/536 |

FOREIGN PATENT DOCUMENTS 0 472 444 A2    2/1992   European Pat. Off. .

OTHER PUBLICATIONS

Foley, James D., Computer Graphics: principles and practice, 1990.
Microsoft ®IME97 for Windows® 95 Upgrade, pp. 38–39, ©1996 Microsoft Corp.
"How to Have Accelerator Keys Support Japanese and US Keyboards," from the Microsoft Technical Support Website, http://www.microsoft.com/kb/articles/q129/0/80.htm, Article Id #Q129080, last reviewed Apr. 19, 1995, pp. 1–2.
"Input Method Editor (IME) in Japanese Windows 3.1," from the Microsoft Technical Support Website, http://www.microsoft.com./kb/articles/q123/3/92.htm, Article ID #Q123392, last reviewed Jul. 23, 1997, pp. 1–2.
"Appendix E1: Far East Enableing: Input Method Editor (IME)," source unknown, 4 pages.
Kano, N., "Common IME System on Far East Windows 95," article adapted from *Developing International Software for Windows NT* by Nadine Kano, Sep. 12, 1995, pp. 1–5.
Tamaru, K. "How to use Japanese IME (Input Method Editor)," Aug. 12, 1997, pp. 1–2.

*Primary Examiner*—Stephen S. Hong
*Assistant Examiner*—Cesar B. Paula
*Attorney, Agent, or Firm*—Jones & Askew, LLP

[57] ABSTRACT

A JAVA-based virtual machine that supports input method editor (IME) functionality in three contexts: (1) using JAVA-based IMEs with a JAVA virtual machine; (2) writing JAVA-based IMEs; and (3) integrating a JAVA virtual machine to system IMEs. The virtual machine includes a windows manager, an input method manager, one or more IMEs and/or keyboard drivers (KBDs), and a component. The virtual machine may also include an IME bridge for integrating the virtual machine with a system IME. The windows manager serves as a gateway between the operating system and the virtual machine. The input method manager (IMM) serves as a router between the windows manager and a plurality of IMEs and keyboards driver (KBDs). The IME includes a look-up table of composed characters that are indexed by Unicode keyboard commands. The component typically renders a user interface that allows the user to manipulate the composed characters returned by the IME. The functionality of the IME and the component may vary from platform to platform, and from user to user. The virtual machine can implement a predefined set of interfaces that allow the IME and the component to communicate with each other and with the windows manager and the input method manager. These predefined interfaces allow users to modify the functionality of the IME and component and integrate these modified elements with the virtual machine.

23 Claims, 11 Drawing Sheets

PRIOR ART - IME INVOKED

PRIOR ART - IME NOT INVOKED

METHOD FOR INTEGRATING A VIRTUAL MACHINE WITH INPUT METHOD EDITORS

REFERENCE TO RELATED APPLICATION

The present application is a continuation-in-part of U.S. patent application Ser. No. 08/831,975, filed Apr. 2, 1997, now ABN. inventors David M. Silver and Yung-Shin Lin, and entitled "Method For Integrating A Virtual Machine With An Input Method Editor."

TECHNICAL FIELD

The present invention relates generally to extended keyboard editors, and more particularly, relates to integrating a platform-portable virtual machine with input method editors for creating composed characters, such as calligraphic ideograms in non-Latin languages including Japanese, Chinese, and Korean.

BACKGROUND OF THE INVENTION

Global connectivity provided by the Internet will increase the demand for internationalized software products and place additional requirements on internationalized applications. For example, applications that are delivered and run over the Internet may need to adapt to the user's language at run time. Other applications will need to be multilingual and support a combination of different languages. A platform-portable programming language, JAVA, has been designed to support internationalization. The JAVA primitive character type is based on Unicode, which is an international standard for encoding written language elements.

Although JAVA includes support for Unicode strings, many text editors use double-byte character set (DBCS) encoding, and many text files contain DBCS strings rather than Unicode strings. For text files that contain DBCS strings, the source files must be converted to Unicode when compiled. In addition, DBCS strings must be converted to Unicode during read and write operations. The MICROSOFT system development tools for JAVA enhance the internationalization features of JAVA with support for DBCS encoding and MICROSOFT WINDOWS resources.

Specifically, the MICROSOFT JAVA compiler (JVC) translates DBCS literal strings in source code files to Unicode when compiling the source code into class files. When a browser with Unicode-enabled JAVA support (for example, the support in MICROSOFT INTERNET EXPLORER, version 3.0) runs these class files, the literal strings will therefore appear correctly. In addition, the MICROSOFT virtual machine allows a system developer to write JAVA-based programs that convert text strings between DBCS and Unicode.

An input method editor (IME) is a program that allows computer users to enter complex characters and symbols, such as Japanese Kanji characters, using a standard keyboard. Internationalized versions of MICROSOFT WINDOWS provide system IMEs for locales with languages using non-Latin alphabets, such as Japanese, Korean, traditional Chinese, and simplified Chinese. IMEs may also be developed for other languages, such as Russian, Arabic, Hebrew, and so forth.

At present, IME source code cannot be modified by system developers on an as-needed basis. Making IME source code alteration generally available is complicated by the fact that IMEs are implemented on many different types of platforms using different operating systems. The prospect of updating every possible operating system that might have to interact with an IME is not a practical solution.

There is, therefore, a need for a platform-portable virtual machine that allows individual developers to modify IME source code on an as-needed basis. In particular, there is a need for a system that provides IME support for JAVA applications that host JAVA-based IMEs as well as existing system IMEs.

SUMMARY OF THE INVENTION

The present invention meets the need for a platform-portable virtual machine that allows individual developers to modify input method editor (IME) source code on an as-needed basis by integrating a JAVA virtual machine with one or more IMEs. The JAVA programming environment can advantageously be implemented on a wide variety of platforms using different operating systems. Therefore, a system developer can use a JAVA virtual machine to modify IME source code on a wide variety of platforms using different operating systems. In addition, an IME modified on one platform may be ported to other platforms using other operating systems. The invention thus provides a platform-portable virtual machine that allows individual developers to modify IME source code on an as-needed basis.

A JAVA-based virtual machine according to the present invention supports input method editor (IME) functionality in three contexts: (1) using JAVA-based IMEs with a JAVA virtual machine; (2) writing JAVA-based IMEs; and (3) integrating a JAVA virtual machine to system IMEs. The virtual machine includes a windows manager, an input method manager, one or more IMEs and/or keyboard drivers (KBDs), and one or more components. The virtual machine may also include a system IME bridge for integrating the virtual machine with existing system IMEs, and a system KBD bridge for integrating the virtual machine with existing system KBDs. The windows manager serves as a gateway between the operating system and the virtual machine. The input method manager (IMM) serves as a router between the windows manager and a plurality of IMEs and KBDs. The IME includes a look-up table of composed characters that are indexed by Unicode keyboard commands. The component typically renders a user interface that allows the user to manipulate the composed characters returned by the IME.

To accommodate user-definable IMEs and components, the virtual machine implements a predefined set of interfaces that allow the IMEs and components to communicate with each other and with the other elements of the virtual machine, namely the windows manager and the IMM. These predefined interfaces allow system developers to modify the functionality of IMEs and components, and to integrate the modified IMEs and components with the virtual machine. Specifically, a compatible IME implements an interface known as the Interface Method Listener Interface. The IMM implements an interface known as the Input Manager Listener Interface. The windows manager implements an interface known as the Input Method Callback Interface. And the component implements an interface known as the Input Method Message Listener Interface. A compatible IME is created by writing an IME that implements the Input Method Listener Interface. That is, creating an IME that implements the Input Method Listener Interface is necessary and sufficient for creating an IME that is compatible with a virtual machine constructed according to the present invention.

Generally described, the invention is a platform-portable virtual machine that runs on a computer system including a keyboard, a display device, a processing unit, and an operating system running on the processing unit. The virtual machine, which also runs on the processing unit, includes a windows manager that receives keyboard commands from the operating system. The input method manager receives the keyboard commands from the windows manager. The input method editor receives the keyboard commands from the input method manager and translates the keyboard commands into a composed character, such as a calligraphic ideogram or an element of a calligraphic ideogram. The component receives the composed character from the input method editor and renders the composed character for display on the display device.

More specifically, the windows manager receives a keyboard command from the keyboard and determines whether the input method manager is active. If the input method manager is not active, the windows manager passes the keyboard command to the component. If the input method manager is active, on the other hand, the windows manager passes the keyboard command to the input method manager and receives a return message from the input method manager. If the input method manager cannot handle the keyboard message, it returns a "FALSE" return message to the windows manager. The windows manager then passes the keyboard command to the component. Alternatively, the input method manager handles the keyboard command and returns "TRUE" to the windows manager.

The input method manager receives the keyboard command from the windows manager and determines whether the keyboard command is directed to the input method manager. The input method manager responds to the keyboard command if the keyboard command is directed to the input method manager responding. For example, the keyboard command may cause the input method manager to inactivate the currently-active input method editor, and to activate an alternative input method editor. If the keyboard command is not directed to the input method manager, the input method manager passes the keyboard command to the currently-active input method editor.

The input method editor receives the keyboard command from the input method manager and may combine the keyboard command with previously received keyboard commands to create a composite string. The input method editor then determines whether the composite string corresponds to a composed character. If the composite string corresponds to one or more composed characters, the input method editor translates the composite string into the composed character(s) and passes the composed character(s) to the windows manager. The windows manager receives the composed character(s) from the input method editor and passes the composed character(s) to the component.

The component receives the composed character(s) from the windows manager, renders a user interface on the display device, and renders the composed character(s) on the display device in association with the user interface. The component may then receive user commands through the user interface, alter the composed character(s) in response to the user commands, and render the altered composed character(s) on the display device in association with the user interface.

The computer system may also include one or more system input method editors running on the processing unit, and the virtual machine may also include an input method editor bridge for integrating the system input method editor (s) with the windows manager and the input method manager.

According to an aspect of the invention, the input method editor defines an interface including a first interface method for receiving a message from the input method manager instructing the input method editor to handle a keyboard command. The input method editor interface may also include a second interface method for receiving a message from the input method manager instructing the input method editor to activate. The input method editor interface may also include a third interface method for receiving a message from the input method manager instructing the input method editor to deactivate. The input method editor interface may also include a fourth interface method for receiving a message from the windows manager instructing the input method editor to handle the message.

The input method editor interface may also include a fifth interface method for receiving a message from the component instructing the input method editor to render a user interface for display on the display device. The input method editor interface may also include a sixth interface method for receiving a message from the component defining the size of the user interface rendered by the input method for display on the display device. The input method editor interface may also include a seventh interface method for receiving a message from the component defining the position of the user interface rendered by the input method for display on the display device.

According to another aspect of the invention, the input method manager defines an interface including a first interface method for receiving a message from the windows manager instructing the input method manager to activate a first input method editor. The input method manager may also include a second interface method for receiving a message from the windows manager instructing the input method manager to remove a second input method editor from a registered list of input method editors. The input method manager may also include a third interface method for receiving a message from the windows manager instructing the input method manager to identify an active input method editor. The input method manager may also include a fourth interface method for receiving a message from the windows manager instructing the input method manager to enumerate the list of registered input method editors. The input method manager may also include a fifth interface method for receiving a message from the windows manager asking the input method manager to handle a keyboard command.

According to yet another aspect of the invention, the windows manager defines an interface including an interface method for receiving messages from the input method editor. In addition, the component defines an interface including an interface method for receiving messages from the windows manager.

That the present invention improves over the drawbacks of the prior art and accomplishes the objects of the invention will become apparent from the detailed description of the exemplary embodiments to follow.

DETAILED DESCRIPTION OF THE EXEMPLARY EMBODIMENTS

Figure 1:
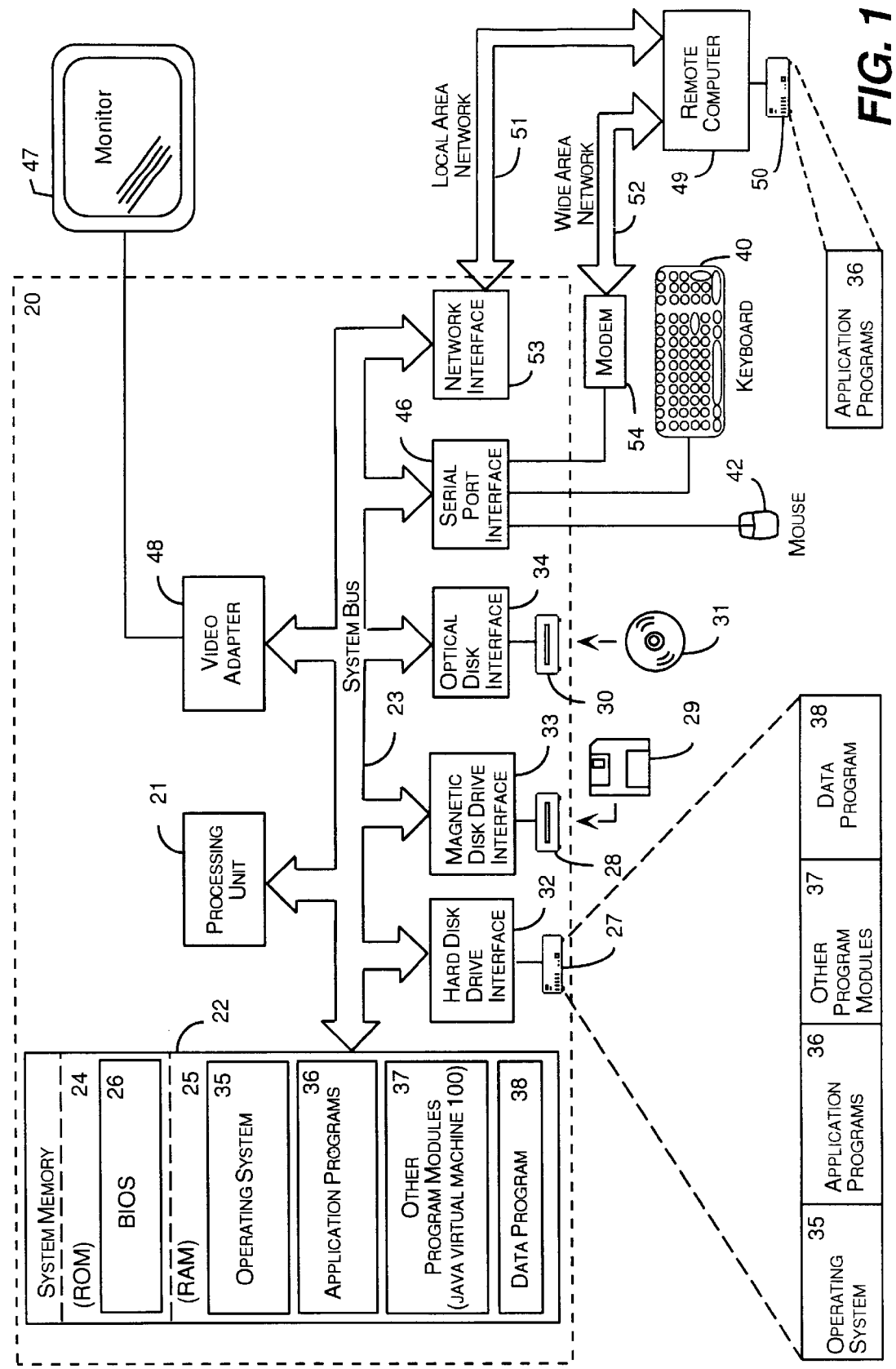
FIG. 1 is a schematic block diagram of the personal computer that provides the operating environment for the exemplary embodiments of the invention.

The present invention may be embodied in a virtual machine that supports IME functionality in three contexts: (1) using JAVA-based IMEs with a JAVA virtual machine; (2) writing JAVA-based IMEs; and (3) integrating a JAVA virtual machine to system IMEs. The virtual machine includes a windows manager, an IMM, one or more JAVA-based IMEs, one or more JAVA-based KBDs, and one or more component. The virtual machine may also include a system IME bridge for integrating the virtual machine with system IMEs, and a system KBD bridge for integrating the virtual machine with system KBDs.

The windows manager serves as a gateway between the operating system and the virtual machine. As such, the windows manager receives keyboard commands from the operating system, including function commands and compound keyboard commands, such as "CTRL +" "ALT +" and "CTRL ALT +" that increase the number of characters that can be uniquely identified by a standard keyboard. The windows manager translates the keyboard commands into a standard Unicode format and routes the Unicode keyboard commands to the component or to the IMM, as appropriate. The windows manager also receives composed characters returned by an IME and routes the composed characters to the component for display and further manipulation by the user, as defined by the functionality of the component. The windows manager may also receive IME messages and route the IME messages to the component.

The IMM serves as a router between the windows manager and a plurality of IMEs and KBDs. The IMM responds to certain IMM commands, such as toggle commands, that allow a user to activate a particular IME or KBD. The IMM typically responds to an IMM command by deactivating the previously-active IME or KBD and activating the indicated IME or KBD. The IMM then routes subsequent keyboard commands to the activated IME or KBD until another IMM command is received.

The IME includes a look-up table of composed characters that are indexed by the various Unicode keyboard commands. The IME receives the Unicode messages from the windows manager and translates the Unicode messages into the corresponding composed characters. To further increase the number of characters that can be uniquely identified by a standard keyboard, the IME may be configured to index composed characters based on multiple keyboard commands. That is, the IME may combine a number of Unicode keyboard commands to build a Unicode composite string that corresponds to one or more predefined composed characters. The use of multiple-keyboard command composite strings allows the IME to index thousands of individual composed characters, which is very useful for generating calligraphic ideograms in non-Latin languages, such as Japanese, Korean, and Chinese. The IME then passes the composed character to the windows manager, which passes the composed character to the component for further manipulation by the user.

The IME may also pass instructions, known as IME messages, to the windows manager. The windows manager typically passes the IME messages on to the component. IME messages typically include composition messages, such as "begin composed character" and "end composed character," that allow the IME to interact with the component. The component and the IME may be configured by system developers to handle many other IME messages on as as-needed bases. The JAVA virtual machine provides a mechanism by which the component and the IME may communicate, but the JAVA virtual machine does not dictate the functionality of the component or the IME. Nor does the JAVA virtual machine dictate the types or structure of the IME messages that may be communicated between the component and the IME. Thus, the specific IME messages are not determined by the virtual machine, but rather are left to be defined by individual system developers on an as-needed basis. The function of the virtual machine is to provide a standardized vehicle for integrating user-definable IMEs with user-definable components.

Although the component or the IME may be configured to control the IME's drawing space, the component typically renders a user interface that allows the user to alter the composed character, such as a calligraphic ideogram or element of a calligraphic ideogram, returned by the IME. Of course, the functionality of particular user-definable IMEs and components may vary from platform to platform, and from user to user. To accommodate these user-definable IMEs and components, the virtual machine implements a predefined set of interfaces that allow the IMEs and components to communicate with each other and with the other elements of the virtual machine, namely the windows manager and the IMM. These predefined interfaces allow system developers to modify the functionality of IMEs and components, and to integrate the modified IMEs and components with the virtual machine.

Central to the exemplary embodiments of invention, therefore, is the definition of a set of cooperating interfaces that allow the elements of the virtual machine to communicate with each other. A compatible IME implements an interface known as the Interface Method Listener Interface. The Interface Method Listener Interface preferably includes eight interface methods: Handle Key—instructs the IME to attempt to respond to an event (e.g., keyboard command); Handle IME message—instructs the IME to handle an IME message; Set Visible Component—tells the IME which module controls the IME's drawing space; Set Position—instructs the IME to begin drawing at a specific location; Get Size—gets the size of the graphic image that the IME will draw; Paint—instructs the IME to begin drawing a character; Activate—instructs the IME to respond to subsequent messages; and Deactivate—instructs the IME not to respond to subsequent messages (except activate).

The IMM implements an interface known as the Input Manager Listener Interface. The Input Manager Listener Interface preferably includes five interface methods: Get Input Method—instructs the IMM to identify the active IME; Get Number Input Methods—instructs the IMM to enumerate the registered IMEs; Remove Input Method—instructs the IMM to remove an IMM from the registered list of IMEs; Set Input Method—instructs the IMM to activate a particular IME; and Handled Key—allows the windows manager to pass a keyboard command to the IMM and obtain a return message from the IMM indicating whether the IMM accepted or rejected the keyboard command.

The windows manager implements an interface known as the Input Method Callback Interface. The Input Method Callback Interface preferably includes two interface methods: Handle IME Char—used by an IME to return a composed character, such as a calligraphic ideogram or an element of a calligraphic ideogram, to the windows manager; and Handle IME Message—used by an IME to pass an IME message to the windows manager.

The component implements an interface known as the Input Method Message Listener Interface. The Input Method Message Listener Interface preferably includes one interface method: Handle IME Message—used the windows manager to pass IME messages to the component.

A compatible IME is created by writing an IME that implements the Input Method Listener Interface. That is, creating a IME that implements the Input Method Listener Interface is necessary and sufficient for creating an IME that is compatible with a virtual machine constructed according to the present invention. The virtual machine may also include a system IME bridge that integrates the virtual machine with a system IME. The system IME bridge inserts flags or other command name identifiers into IME messages to prevent unwanted feedback from the system IME to the operating system. Similarly, the virtual machine may also include a system KBD bridge that integrates the virtual machine with a system KBD.

JAVA-based IMEs provide more flexibility and control than system IMEs. For example, JAVA-based IMEs can be used with any version of WINDOWS. Thus, cross-platform JAVA-based IMEs may run on any system that has the virtual machine installed. Multiple JAVA-based IMEs, based on different languages, may therefore be activated concurrently by a single JAVA application. JAVA-based IMEs can be packaged and downloaded from the Internet with applets or downloaded at the discretion of the user. Applications can control Java IME interface elements such as composition, status, and candidate windows. Secure JAVA-based IMEs follow normal JAVA security rules and run in the "sandbox" with JAVA applications.

The com.ms.util.InputMethod package contains the Input Method Listener interface class, which is the base class for JAVA-based IMEs. IMEs based on this class will be recognized by the IMM. The virtual machine also supports existing system IMEs enclosed in a COM wrapper interchangeably with JAVA-based IMEs. However, there are some limitations associated with using system IMEs. A JAVA-based IME may be used on any system regardless of what language the system is localized for as long as the JAVA virtual machine is installed. System IMEs, on the other hand, are limited to IMEs supported by the IMM on the host system. For example, a Korean system IME cannot run in connection with a version of WINDOWS 95 that is localized for Greece.

System IMEs are supported with the System IME class in the com.ms.util.InputMethod package. The System IME class implements the Input Method Listener interface by embedding a COM object to communicate directly with the system IMEs. The COM object receives keyboard command messages from the IME and routes the result of the composition to the windows manager and on to the component.

The com.ms.util.InputMethod package contains Microsoft's implementation of an exemplary embodiment of the invention. The class known as "Input Method Message" is an abstract class defined in the com.ms.util.InputMethod package. This class provides a base from which IME message classes can be derived. That is, if an IME wants to pass a message to the windows manager by using the Handle IME Message, then the class of the message should be derived from the Input Method Message class.

Another class defined in the com.ms.util.InputMethod package is known as "IME Composition Message." This class is derived from the Input Method Message class. The IME Composition Message class is used by an IME to pass IME composition messages, such as "begin composed character" and "end composed character." It also allows the component to retrieve the composition string from the IME.

Another class defined in the com.ms.util.InputMethod package is known as "IME Notify Message." This class is used by an IME to communicate with components to provide advanced control over the user interface for display on the display device.

Referring now to the drawings, in which like numerals indicate like elements throughout the several figures, the exemplary embodiments of the present invention will be described below. Generally, FIG. 1 illustrates the operating environment of the disclosed embodiments of the invention.

Exemplary Operating Environment

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media that are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. In particular, one of the other program modules 37 is a JAVA virtual machine 100 that includes certain embodiments of the invention, which are described in detail below with reference to FIGS. 2–13. JAVA, a registered trademark of SUN MICROSYSTEMS, refers to a multi-platform programming language, as is known to those skilled in the art. A user of the JAVA virtual machine 100 may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Operation of the Disclosed Embodiment

Figure 2:
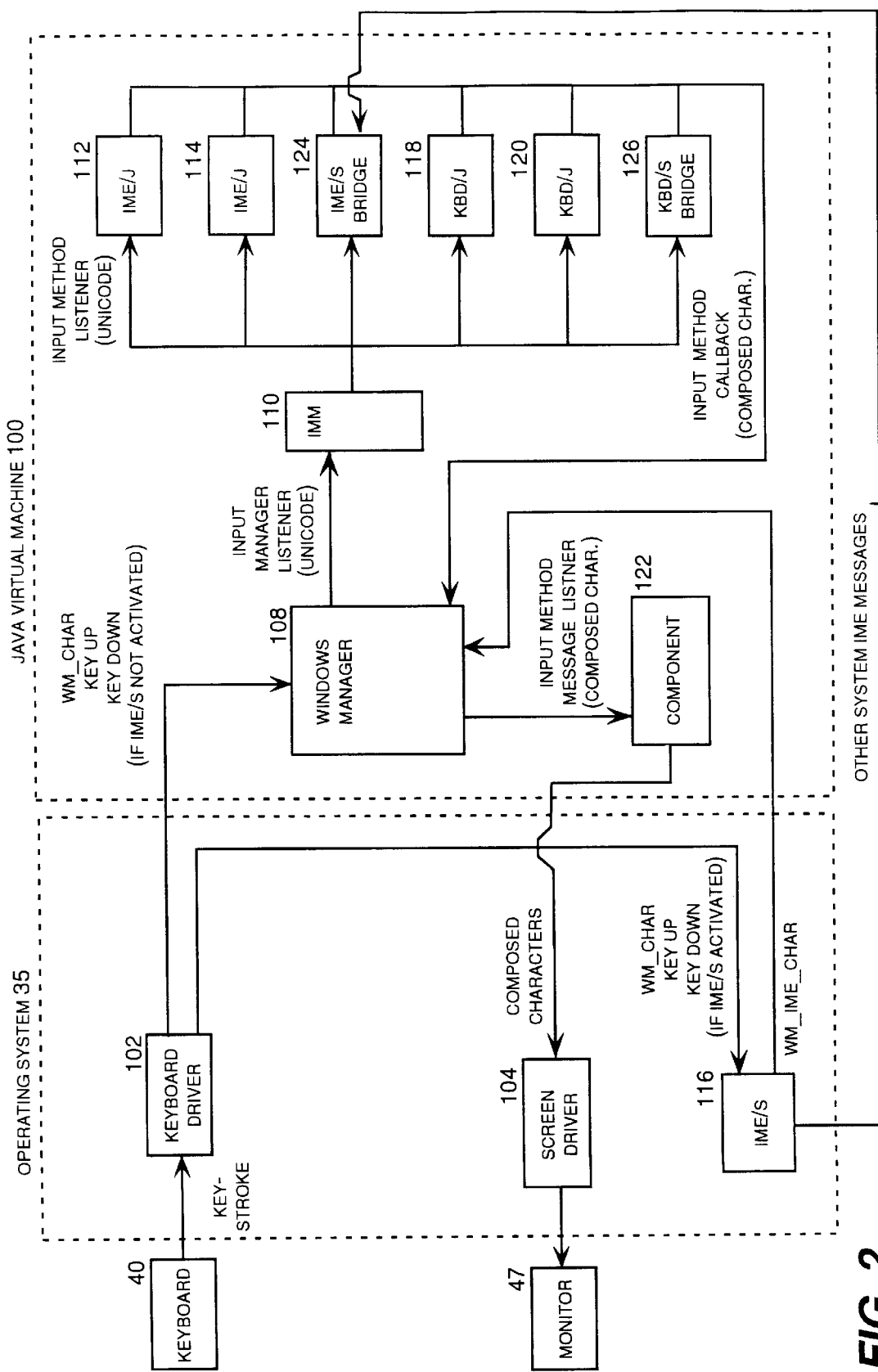
FIG. 2 is a schematic block diagram that illustrates an operating system that cooperates with a platform-portable virtual machine for integrating the operating system with a plurality of input method editors and keyboard drivers.

FIG. 2 is a schematic block diagram that illustrates an operating system 35 that cooperates with a JAVA virtual machine 100 including a plurality of JAVA-based input method editors represented by the IME/Js 112 and 114, and plurality of JAVA-based keyboard drivers represented by the KBD/Js 118 and 120. The author of a document written in calligraphic ideograms creates the calligraphic ideograms by entering predefined keyboard commands into the keyboard 40 or some other suitable type of input device. The operating system 35 receives these keyboard commands at a keyboard driver 102, which translates the keyboard commands into keyboard commands. Each keystroke is translated into three keyboard commands that may be handled and interpreted individually: WM_KEYDOWN—indicating that a key has been depressed, WM_CHAR—typically an ASCII code or value associated with the depressed key, and WM_KEYUP—indicating that a key has been released. These keyboard commands are delivered to the JAVA virtual machine 100.

The keyboard commands are initially received by a JAVA windows manager 108 that translates the commands into Unicode keyboard commands that are understood by the other components of the JAVA virtual machine 100. The windows manager 108 typically consumes the WM_KEYDOWN and WM_KEYUP keyboard commands, which serve as delimiters for keyboard commands including multi-key complex keyboard commands. The windows manager 108 typically then passes Unicode translations of the WM_KEYDOWN and WM_KEYUP keyboard commands to the IMM 110, which operates as a router between the windows component 108 and a plurality of IMEs and KBDs.

IMEs are typically used to create composed characters in non-Latin languages, such as Chinese, Korean, and Japanese. IMEs are usually quite sophisticated and often use multiple keyboard commands to define an individual composed characters. IMEs also usually operate in connection with a component that allows the user to further manipulate the composed characters generated by the IME. KBDs are relatively simple translators that are used to create characters in Latin languages, such as French, German, and Spanish. Unlike IMEs, KBDs typically use single keyboard commands and compound keyboard commands (i.e., multiple keys depressed simultaneously) to define an individual composed characters. KBDs typically do not require the functionality afforded by a component user interface. Nevertheless, KBDs could be developed with all of the sophistication and component user interface functionality usually associated with an IME.

The IMM 110 is operative for maintaining a list of registered IMEs and KBDs, and activating and deactivating the IMEs and KBDs in the registered list. For example, a first JAVA-based IME, designated as IME/J 112, may be operative for generating calligraphic ideogram in Chinese. A second JAVA-based IME, designated as IME/J 114, may be operative for generating calligraphic ideogram in or Japanese. In addition, a first JAVA-based KBD, designated as KBD/J 118, may be operative for writing in French. A second JAVA-based KBD, designated as KBD/J 120, may be operative for writing in German or Spanish. For clarity, the following discussion will refer only to the IMEs. It should be understood, however, that similar operations may be implemented for the KBDs.

The IMM 110 serves as a router between the windows manager 108 and a plurality of IMEs, represented by the IMEs 112, 114 and 116. The IME/Js 112 and 114 represent JAVA-based IMEs and the IME/S 116 represents a system IME. To select among these IMEs 112, 114 and 116, the IMM 110 responds to certain predefined IMM commands (e.g., toggle commands) that allow a user to select a particular IME. The IMM 110 responds to an IMM command by deactivating the previously-active IME and activating the indicated IME. The IMM 110 then routes subsequent events to the activated input method editor until another IMM command is received. For non-IMM commands, the IMM 110 routes the commands from the windows manager 108 to the active IME. The commands passed to the active IME from the IMM 108 typically include Unicode translations of WM_KEYDOWN and WM_KEYUP keyboard commands. The keyboard commands passed to the active IME from the IMM 110 may also include function commands for controlling the IME.

The implementation of the Input Method Listener Interface by the JAVA-based IME/Js 112 and 114 is necessary and sufficient for allowing the JAVA windows manager 108 to interact properly with the IMEs. Thus, the IME/Js 112 and 114, which are to be created by JAVA developers according to the constructs of the JAVA Virtual Machine System Development Kit (SDK), are typically programmed to communicate with the operating system 35 through the virtual machine 100. But the operating-system-based IME/S 116, which may have been created before the virtual machine 100 or without regard to the virtual machine 100, may be programmed to communicate directly with the operating system 35 under certain circumstances. This feedback between the IME/S 116 and the operating system 35, which in turn supplies IME messages to windows manager 108, can result in commands entering a continual loop between the operating system 35 and the JAVA virtual machine 100 or other unpredictable and undesirable results.

To prevent this type of feedback, the JAVA virtual machine 100 typically includes an IME/S bridge 124 that links the windows manager 108 to the system IME/S 116. The JAVA virtual machine 100 also typically includes a system KBD/S bridge 126 that links the windows manager to a system KBD/S. The system IME/S bridge 124 and the system KBD/S bridge 126 insert flags or other command name identifiers into the commands generated by the IME/S 116 and the system KBD/S, respectively, to prevent unwanted feedback from the IME/S 116 to the operating system 35. Specifically, the system IME/S bridge 124 provides an interface for the IMM 110 to communicate with system IMEs, represented by the IME/S 116. For example, the IMM 110 may use the IME/S bridge 124 to activate or deactivate the IME/S 116. Without the IME/S bridge 124, the IMM 110 would be unable to communicate with the IME/S 116.

Composed characters created by an IME are returned to the windows manager 108, which passes the composed characters to one or more components, represented by the component 122. The component 122 translates composed characters into operating system commands that are understood by the screen driver 104 of the operating system 35. Specifically, the JAVA component 122 implements a sequence of commands including a "key event" command, a "post event" command, and a "key down" command to render images on the monitor 47, as is well known to those skilled in the art.

The component 122 typically renders a user interface that includes one or more tool bars including a number of editing tools. The user interface is displayed on the monitor 47 in association with a composed character returned by an IME. The user interface allows the component 122 to receive user commands to further manipulate the composed character. For example, the component 122 may cause a composed character received from an IME to be displayed within the user interface. The component 122 may then accept user commands created with the editing tools of the user interface to alter or augment the composed character. The component 122 thus integrates an IME with a JAVA-based user interface for manipulating the composed characters returned by the IME. Alternatively, the virtual machine 100 allows the active IME to draw a composed character within a drawing space controlled by another program module, such as a word processor or editor.

Figure 3:
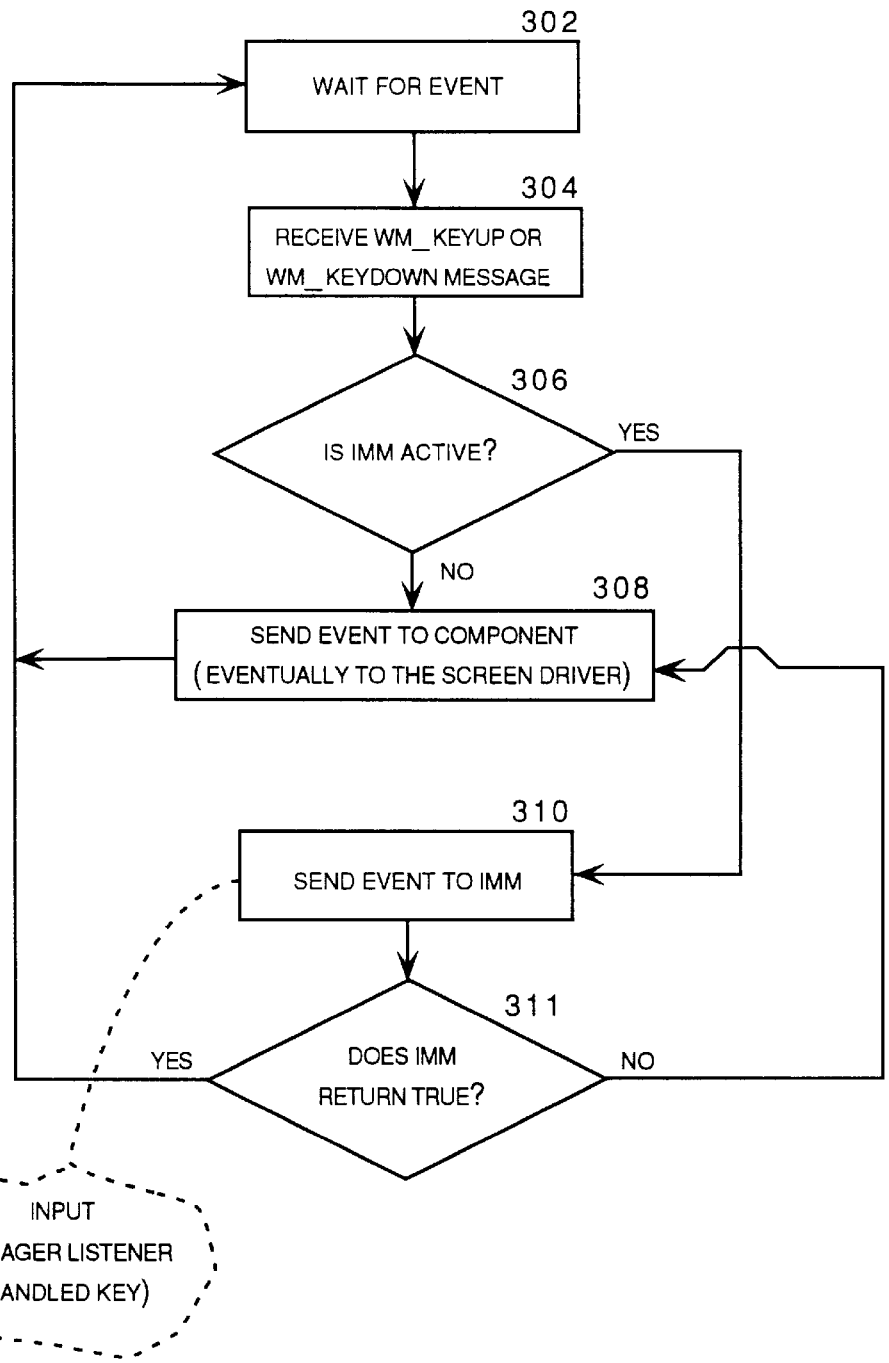
FIG. 3 is a logic flow diagram that illustrates a first routine for operating a windows manager within the virtual machine of FIG. 2.

FIG. 3 is a logic flow diagram that illustrates a first routine 300 for operating the windows manager 108 within the virtual machine 100. In step 302, the windows manager 108 waits for an event. The windows manager 108 typically receives two types of events, keyboard commands from the operating system 35, and IME messages, including composed characters and other system IME messages, from an IME. In step 304, the windows manager 108 receives an event, in this case a keyboard command from the operating system.

In step 306, the windows manager 108 determines whether the virtual machine 100 includes an active IMM, represented by the IMM 110. If the virtual machine 100 does not include an active IMM, the "NO" branch is followed to step 308, in which the windows manager 108 passes the Unicode translation of the keyboard command to the component 122. If the virtual machine 100 includes an active IMM, the "YES" branch is followed to step 310, in which the windows manager 108 passes the Unicode translation of the keyboard command to the IMM 110.

Depending on the type of command, the IMM 110 may accept the event, or the IMM 110 may refuse the event. In step 311, the windows manager 108 checks whether the IMM accepted the event. The windows manager 108 preferably performs this query by receiving a return message from the Handled Key method of the Input Manager Listener Interface, which was called to pass the keyboard command to the IMM 110. If the IMM 100 returns "TRUE" indicating that the IMM accepted the event, the "YES" branch loops to step 302, in which the windows manager 108 waits for another event. If the IMM 100 returns "FALSE" indicating that the IMM refused the event, the "NO" branch loops to step 308, in which the windows manager 108 passes the event to the component 122.

Following step 308, routine 300 loops to step 302, in which the windows manager 108 waits for another event. The query of step 311 allows certain events to be passed to the component 122 after the IMM 110 refuses to accept the events. Thus, the windows manager 108 processes each event by passing the event to the IMM 110, or by passing the event to the component 122 for further processing and eventual rendering on the monitor 47.

Figure 4:
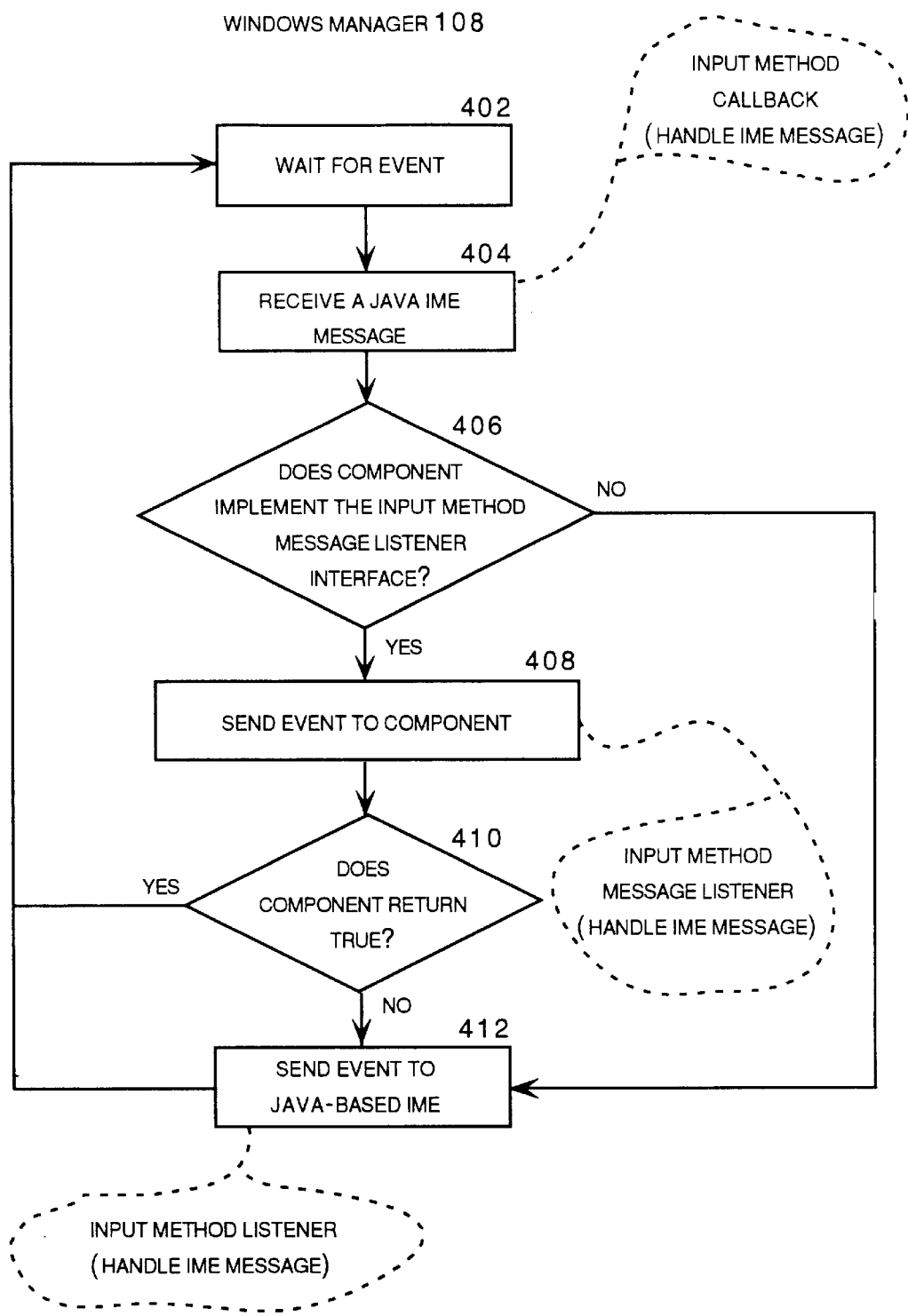
FIG. 4 is a logic flow diagram that illustrates a second routine for operating a windows manager within the virtual machine of FIG. 2.

FIG. 4 is a logic flow diagram that illustrates a second method 400 for operating a windows manager within the virtual machine 100. In step 402, the windows manager 108 waits for an event. In step 404, the windows manager 108 receives an event, in this case a composed character or other system IME messages from an IME. The IME preferably passes the event to the windows manager 108 by calling the Handle IME Message method of the Input Method Callback Interface.

In step 406, the windows manager 108 determines whether the component 122 implements the Input Method Message Listener Interface. If the component 122 implements the Input Method Message Listener Interface, the "YES" branch is followed to step 408, in which the windows manager 108 passes the event to the component 122. The windows manager 108 preferably passes the event to the component 122 by calling the Handle IME Message method of the Input Method Message Listener Interface. If the component 122 does not implement the Input Method Message Listener Interface, the "NO" branch is followed to step 412, in which the windows manager 108 passes the event directly to the active IME.

Referring again to step 408, the component 122 may accept the event, or the component 122 may reject the event. If the component 122 accepts the event, the component preferably returns "TRUE" to the Handle IME Message command. If the component 122 rejects the event, the component preferably returns "FALSE" to the Handle IME Message command. In step 410, the windows manager 108 determines whether the component 122 returns "TRUE." If the component 122 returns "TRUE," the "YES" branch loops to step 402, in which the windows manager waits for another event. If the component 122 returns "FALSE," the "NO" branch is followed to step 412, in which the windows manager 108 passes the event to the event to the active IME. Following step 412, routine 400 loops to step 402, in which the windows manager 108 waits for another event.

Routine 400 thus passes each IME message, including composed characters and other system IME commands, to the component 122 or to the active IME. Permitting the windows manager 108 to pass the IME either to the component 122 or to the active IME allows a JAVA system developer to configure either the component 122 or the IME to accept a particular IME message. Therefore, JAVA system developers may select IME messages that they are interested in to be processed by the component, and leave other IME messages to the IME for default processing. The objective of this feature is to provide the JAVA system developers with flexibility in designing the components and the IME on a case-by-case basis.

Figure 5:
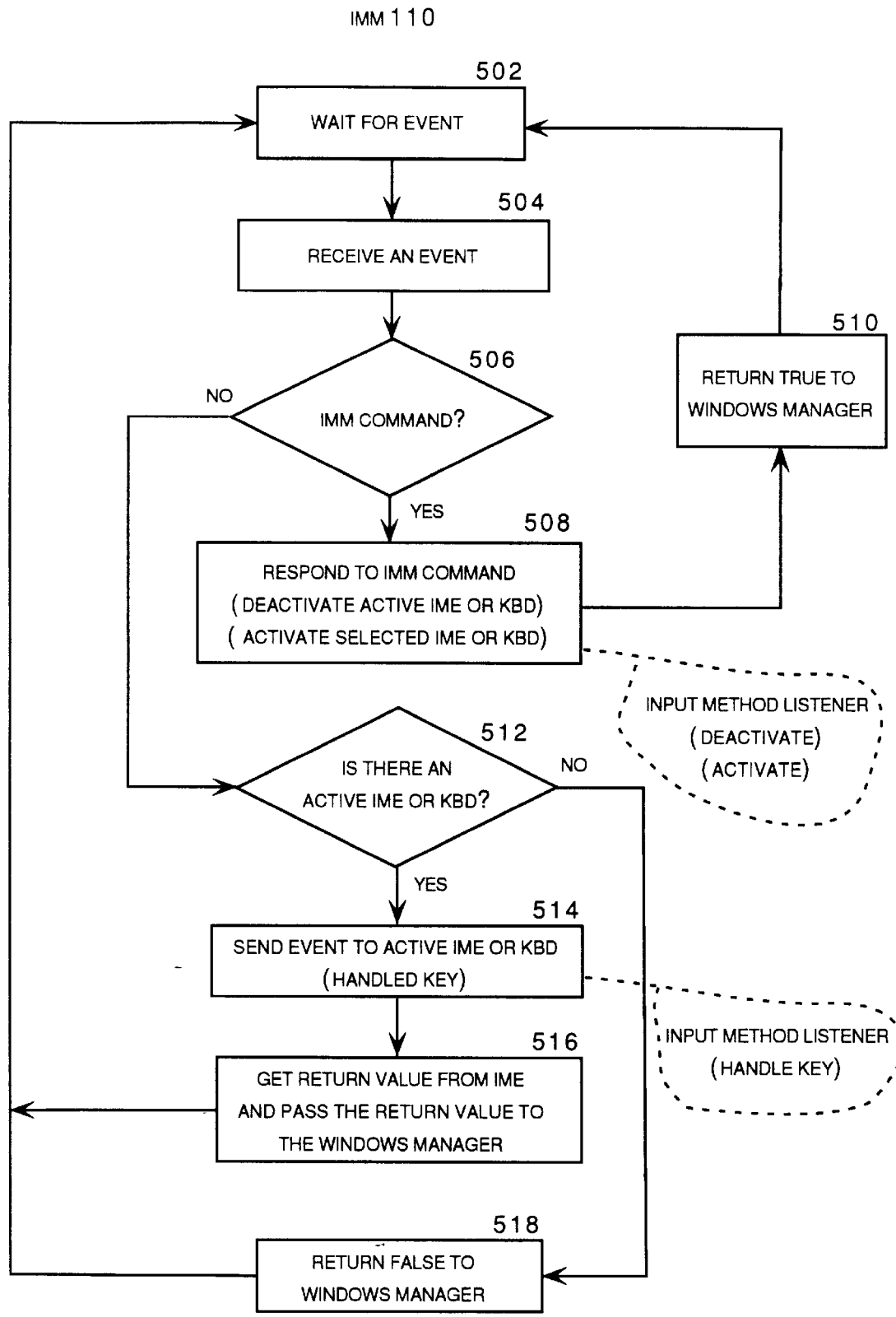
FIG. 5 is a logic flow diagram that illustrates a routine for operating an input method manager within the virtual machine of FIG. 2.

FIG. 5 is a logic flow diagram that illustrates a routine 500 for operating the IMM 110 within the virtual machine 100. In step 502, the IMM 110 waits for an event, typically a Unicode translation of a WM_KEYUP or WM_KEYDOWN keyboard command received from the windows manager 108. In step 504, the IMM 110 receives an event from the windows manager 108. In step 506, the IMM 110 determines whether the event is an IMM command. If the event is an IMM command, the "YES" branch is followed from step 506 to step 508, in which the IMM 110 responds to the IMM command, for example by deactivating the previously-active IME and activating the indicated IME. The IMM preferably deactivates the previously-active IME by calling the Deactivate method of the Input Method Listener Interface, and activates the indicated IME by calling the Activate method of the Input Method Listener Interface. Step 508 is followed by step 510, in which the IMM 110 returns "TRUE" to the windows manager 108 indicating that the event has been accepted by the IMM. After step 510, routine 500 loops to step 502, in which the IMM 110 waits for another event.

Referring again to step 506, if the event is not an IMM command, the "NO" branch is followed from step 506 to step 512, in which the IMM 110 determines whether the virtual machine 100 includes an active IME. If the virtual machine 100 includes an active IME, the "YES" branch is followed to step 412, in which the IMM 110 passes the event to the active IME. The IMM 110 preferably passes the event to the active IMM by calling the Handle Key method of the Input Method Listener Interface. Step 514 is followed by step 516, in which the IMM 110 gets the return value from the active IME and passes the return value to the windows manager 108, indicating that the event has been accepted by the IMM. After step 516, routine 500 loops to step 502, in which the IMM 110 waits for another event.

Referring again to step 512, if the virtual machine 100 does not include an active IME, the "NO" branch is followed from step 512 to step 518, in which the IMM 110 returns "FALSE" to the windows manager 108, indicating that the event has been refused by the IMM. After step 518, routine 500 loops to step 502, in which the IMM 110 waits for another event. Thus, the IMM 100 processes each event by deactivating a previously-activated IME and activating an indicated IME (and returning "TRUE" to the windows manager 108), passing the event to the active IME (and passing the return value from the IME to the windows manager 108), or returning "FALSE" to the windows manager 108 indicating that the IMM refused the event.

Figure 6:
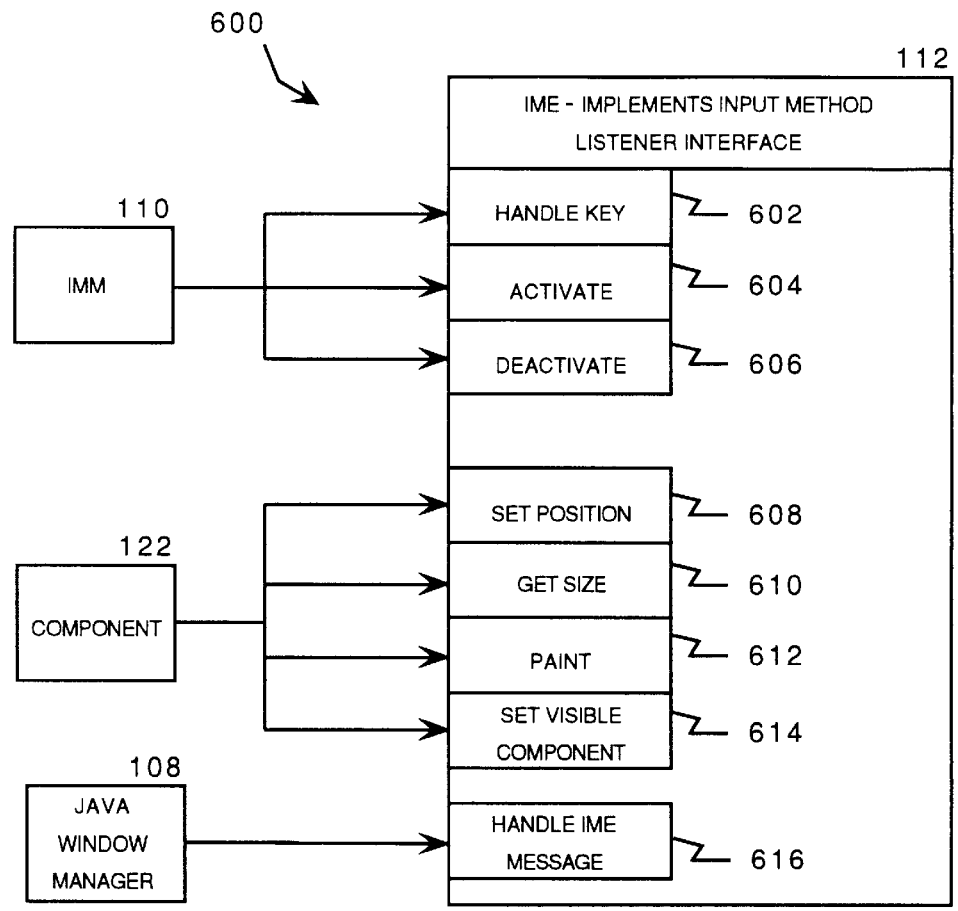
FIG. 6 is a schematic block diagram that illustrates an interface for an input method editor in accordance with an embodiment of the present invention.

FIG. 6 is a schematic block diagram that illustrates the Input Method Listener Interface 600 implemented by an IME that is compatible with the virtual machine 100. An IME or KBD, such as the representative IME/J 112, must implement the Input Method Listener Interface compatible with the virtual machine 100. The Input Method Listener Interface 600 preferably includes a first interface method HANDLE KEY 602. The HANDLE KEY interface method 602 is called by the IMM 110 to pass a keyboard command to the IME/J 112. For example, the keyboard command passed to the IME/J 112 may be the Unicode translation of a WM_KEYUP or WM_KEYDOWN keyboard command that was passed to the IMM 110 by the windows manager 108. The IME/J 112 returns "TRUE" if the IME accepts the keyboard command, and returns "FALSE" if the IME does not accept the command.

The HANDLE KEY interface method 602 preferably includes five operands: "imeCallback"—identifies the callback object that implements the Input Method Callback Interface (the windows manager 108); "when"—the time that the HANDLE KEY method was called; "keyCode"—the virtual key code of the keyboard command; "keyChar"—the Unicode key character of the keyboard command; and "state"—the state of the keyboard 40 modifiers (indicating key up or key down and whether the ALT, CTRL, or SHIFT keys are depressed) when the HANDLE KEY method was called.

The Input Method Listener Interface 600 preferably includes a second interface method ACTIVATE 604. The ACTIVATE interface method 604 is called by the IMM 110 to activate an indicated IME. The ACTIVATE interface method 604 preferably includes an operand ("ime") that indicates an IME to be activated. The ACTIVATE interface method 604 does not involve a return message.

The Input Method Listener Interface 600 preferably includes a third interface method DEACTIVATE 606. The DEACTIVATE interface method 606 is called by the IMM 110 to deactivate the currently active IME. The ACTIVATE interface method 606 does not require an operand and does not involve a return message.

The Input Method Listener Interface 600 preferably includes a fourth interface method SET POSITION 608. The SET POSITION interface method 608 is called by the component 122 to set the position of the composed character on the display screen of the monitor 47. The SET POSITION interface method 608 includes operands indicating a coordinate ("x,y") on the display screen of the monitor 47. The SET POSITION interface method 608 does not involve a return message.

The Input Method Listener Interface 600 preferably includes a fifth interface method GET SIZE 610. The GET SIZE interface method 608 is called by the component 122 to get the size of the composed character on the display screen of the monitor 47. The GET SIZE interface method 608 includes an operand indicating a graphics object ("g") that can be used to determine the size of the composed character(s) and/or an associated user interface as it appears on the display screen of the monitor 47. The graphics object ("g") may also determine the font and color of the composed character(s) and/or an associated user interface as it appears on the display screen of the monitor 47. The GET SIZE interface method 610 returns the dimension of the composed character(s) and/or an associated user interface on the display screen of the monitor 40.

The Input Method Listener Interface 600 preferably includes a sixth interface method PAINT 612. The PAINT interface method 612 is called by the component 122 to cause the IME to paint composed character(s) and/or an associated user interface on a particular graphics object. The PAINT interface method 612 includes an operand indicating the graphics object ("g"). The PAINT interface method 612 does not involve a return message.

The Input Method Listener Interface 600 preferably includes a seventh interface method SET VISIBLE COMPONENT 614. The SET VISIBLE COMPONENT interface method 614 is called by the component 122 to set the component 122 as the object that will control the IME's drawing space. The SET VISIBLE COMPONENT interface method 614 includes an operand indicating the component ("c") that will control the IME's drawing space, in this example the component 122. The SET VISIBLE COMPONENT interface method 614 does not involve a return message. The SET VISIBLE COMPONENT interface method 614 allows the IME to draw composed characters within a drawing space controlled by the component 122, typically a user interface displayed on the monitor 47 that includes one or more tool bars including a number of editing tools. If the SET VISIBLE COMPONENT interface method 614 is not called, the IME typically draws the composed character within a drawing space controlled by the IME. Alternatively, the IME may draw the composed character within a drawing space controlled by another program module, such as a word processor or editor.

The Input Method Listener Interface 600 preferably includes an eighth interface method HANDLE IME MESSAGE 616. The HANDLE IME MESSAGE interface method 616 is called by the windows manager 108 to pass a particular IME message to the IME. The HANDLE IME MESSAGE interface method 616 includes the particular IME message, which derives from the abstract Input Method Message class, as an operand. The HANDLE IME MESSAGE interface method 616 does not involve a return message. An IME message is typically generated by the IME and passed to the callback object, the windows manager 108. If the windows manager does not handle the IME message, the windows manager passes the IME message back to the IME by calling the HANDLE IME MESSAGE interface method 616. This gives the windows manager 108 an opportunity to handle the IME message. If the windows manager does not handle the IME message, the IME typically implements a default condition. In other words, the IME "listens" for windows manager 108 activity in responses to an IME message, and the IME implements a default condition if the windows manager 108 does not handle the IME message.

Figure 7:
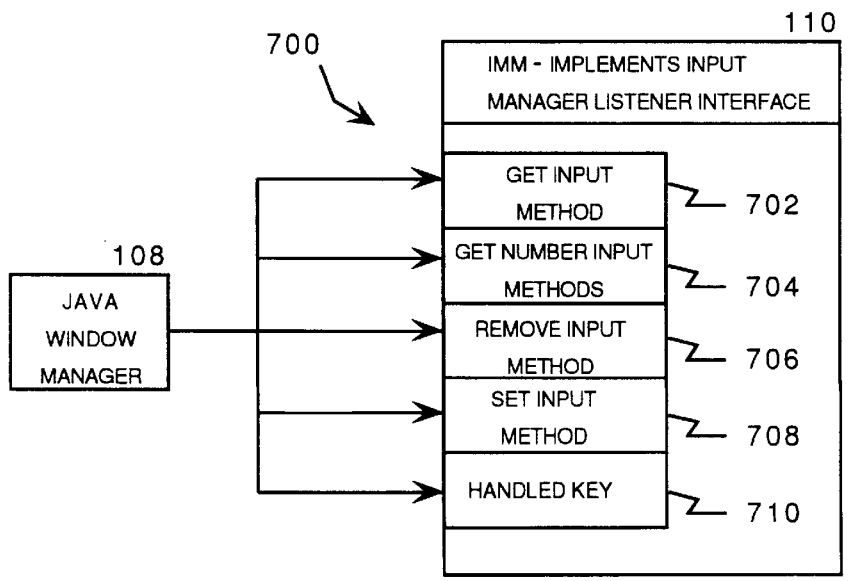
FIG. 7 is a schematic block diagram that illustrates an interface for an input method manager in accordance with an embodiment of the present invention.

FIG. 7 is a schematic block diagram that illustrates the Input Manager Listener Interface 700 for the IMM 100 of the virtual machine 100. The Input Manager Listener Interface 700 preferably includes a first interface method GET INPUT METHOD 702. The GET INPUT METHOD interface method 702 is called by the windows manager 108 to ask the IMM 110 which IME is active. The GET INPUT METHOD 702 involves a return message that includes an operand ("idx") that specifies an index associated with the currently active IME.

The Input Manager Listener Interface 700 preferably includes a second interface method GET NUMBER INPUT METHODS 704. The GET NUMBER INPUT METHODS interface method 704 is called by the windows manager 108 to ask the IMM 110 how many IMEs are registered with the IMM. The GET NUMBER INPUT METHODS interface method 704 involves a return message that enumerates the IMEs that are registered with the IMM. For example, the IMM may return a message that includes an operand that specifies the number of IMEs registered with the IMM. Alternatively, the IMM may return a list of the IMEs that are registered with the IMM.

The Input Manager Listener Interface 700 preferably includes a third interface method REMOVE INPUT METHOD 706. The REMOVE INPUT METHOD interface method 706 is called by the windows manager 108 to ask the IMM 110 remove a particular IME from the registered list of IMEs maintained by the IMM. The REMOVE INPUT METHOD interface method 706 includes an operand ("ime") that indicates the particular IME to be removed from the registered list. The REMOVE INPUT METHOD interface method 706 does not involve a return message.

The Input Manager Listener Interface 700 preferably includes a fourth interface method SET INPUT METHOD 708. The SET INPUT METHOD interface method 708 is called by the windows manager 108 to ask the IMM 110 to activate a particular IME on the registered list of IMEs maintained by the IMM. The SET INPUT METHOD interface method 708 includes an operand ("ime") that indicates the particular IME to be activated. The SET INPUT METHOD interface method 708 does not involve a return message.

The Input Manager Listener Interface 700 preferably includes a fifth interface method HANDLED KEY 710. The HANDLED KEY interface method 710 is called by the windows manager 108 to ask the IMM 110 to handle a keyboard command, typically a Unicode translation of a WM_KEYUP or WM_KEYDOWN keyboard command. The HANDLED KEY interface method 710 returns "TRUE" if the IMM 110 accepts the keyboard command, and returns "FALSE" if the IMM does not accept the command.

The HANDLED KEY interface method 710 preferably includes five operands: "imeCallback"—identifies the callback object that implements the Input Method Callback Interface (the windows manager 108); "when"—the time that the HANDLED KEY method was called; "keyCode"—the ASCII key code of the keyboard command; "keyChar"— the Unicode key character of the keyboard command; and "state"—the state of the keyboard 40 modifiers (indicating key up or key down and whether the ALT, CTRL, or SHIFT keys are depressed) when the HANDLE KEY method was called.

Figure 8:
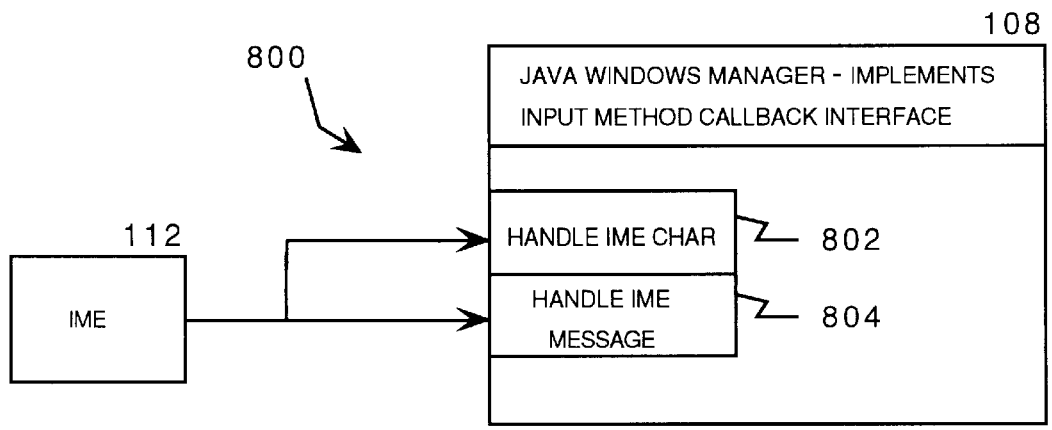
FIG. 8 is a schematic block diagram that illustrates an interface for a windows manager in accordance with an embodiment of the present invention.

FIG. 8 is a schematic block diagram that illustrates the Input Method Callback Interface 800 for the windows manager 108 of the virtual machine 100. The Input Method Callback Interface 800 preferably includes a first interface method HANDLE IME CHAR 802. The HANDLE IME CHAR interface method 802 is called by an IME to pass a particular composed character to the windows manager 108. The windows manager 108 adds the composed character, which may be based on a composite string including a number of keyboard commands, to the internal input queue as if it was a single character received from the keyboard 40. The HANDLE IME CHAR interface method 802 includes three operands: "when"—that time that the HANDLE IME CHAR interface method 802 was called; "keyChar"—the Unicode key character of the composed character; and "state"—the state of the keyboard 40 modifiers (indicating key up or key down and whether the ALT, CTRL, or SHIFT keys are depressed) when the HANDLE IME CHAR interface method 802 was called. The HANDLE IME CHAR interface method 802 does not involve a return message.

The Input Method Callback Interface 800 preferably includes a second interface method HANDLE IME MESSAGE 804. The HANDLE IME MESSAGE interface method 804 is called by an IME to pass a particular IME message to the windows manager 108. The HANDLE IME MESSAGE interface method 804 includes the particular IME message as an operand. The HANDLE IME MESSAGE interface method 804 does not involve a return message. An IME message is typically generated by the IME and passed to the callback object, the windows manager 108. If the windows manager does not handle the IME message, the windows manager passes the IME message back to the IME by calling the HANDLE IME MESSAGE interface method 616 of the Input Method Listener Interface. This gives the windows manager 108 an opportunity to handle the IME message.

Figure 9:
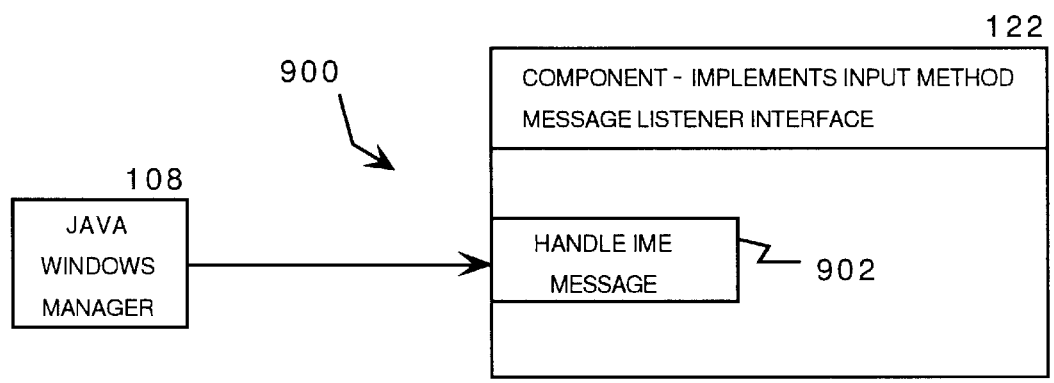
FIG. 9 is a schematic block diagram that illustrates an interface for a component in accordance with an embodiment of the present invention.

FIG. 9 is a schematic block diagram that illustrates the Input Method Message Listener Interface 900 for the component 122 of the virtual machine 100. Input Method Message Listener Interface 900 preferably includes an interface method HANDLE IME MESSAGE interface method 902 that is called by the windows manager 108. This method is called by the windows manager 108 to ask the component 122 whether the component will draw and control a user interface that the user may use to manipulate a composed character returned by an IME. The HANDLE IME MESSAGE interface method 902 may include an IME message, which derives from the abstract class Input Method Message, as an operand. The HANDLE IME MESSAGE interface method 902 involves a return message that indicates whether the component 122 will draw and control a user interface. The component 122 returns "TRUE" if the component will draw and control a user interface, and the component 122 returns "FALSE" if the component will not draw and control a user interface.

It will be appreciated that the composed characters are passed from the windows manager 108 to the component 122 for further processing by the component. In addition, the windows manager 108 and the component 122 may communicate with the operating system 35 to exchange messages related to the composed characters. The composed characters are processed by the operating system 35, the windows manager 108, and the component 122 using standard commands defined in the JAVA class library. These commands are well known to those skilled in the art and, therefore, will not be described further in this specification.

Figures 10A, 10B:
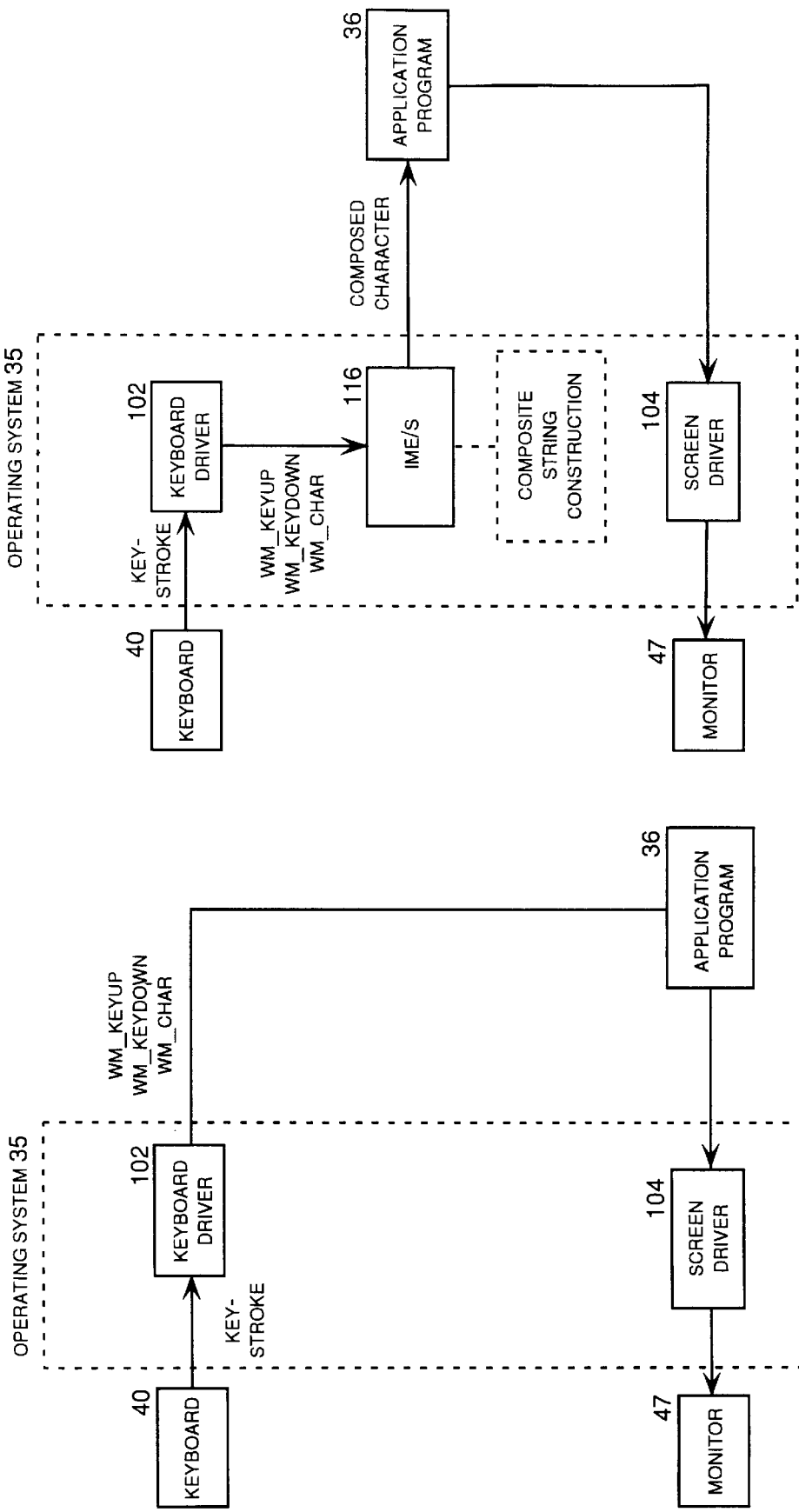
FIG. 10A is a schematic block diagram that illustrates a prior art method for handling keyboard commands.
FIG. 10B is a schematic block diagram that illustrates a prior art for implementing an input method editor.

FIG. 10A is a schematic block diagram that illustrates a prior art method for handling keyboard commands. The user depresses a key on the keyboard 40. The keyboard command is translated into keyboard commands by the keyboard driver 102, which is typically a module of the operating system 35. The keyboard driver 102 translates each keystroke into three keyboard commands that may be handled and interpreted individually: WM_KEYDOWN— indicating that a key has been depressed, WM_CHAR— typically an ASCII code or value associated with the depressed key, and WM_KEYUP—indicating that a key has been released. These keyboard commands are delivered to an application program 36, such as a word processing program, an editor, or the like. The application program 36 interprets the keyboard commands in accordance with functionality defined by the application program. The application then passes a screen update to the screen driver 104, which drives the monitor 47.

FIG. 10B is a schematic block diagram that illustrates a prior art for implementing a system IME 116. The user depresses a key on the keyboard 40. The keyboard command is translated into keyboard commands by the keyboard driver 102. The keyboard driver 102 translates each keystroke into the WM_KEYDOWN, WM_CHAR, and WM_KEYUP keyboard commands. These keyboard commands are delivered to the system IME 116, which translates the keyboard commands into a composed character.

The system IME/S 116 is typically configured to accumulate several keyboard commands to construct a composite string for a composed character. The use of multiple-keyboard command composite strings allows the system IME/S 116 to index thousands of individual composed characters, which is very useful for generating calligraphic ideograms in non-Latin languages including Japanese, Korean, and Chinese. The system IME/S 116 then passes the composed character to the application program 36. The application program 36 interprets the keyboard commands in accordance with functionality defined by the application program. The application then passes a screen update to the screen driver 104, which drives the monitor 47.

Figure 11:
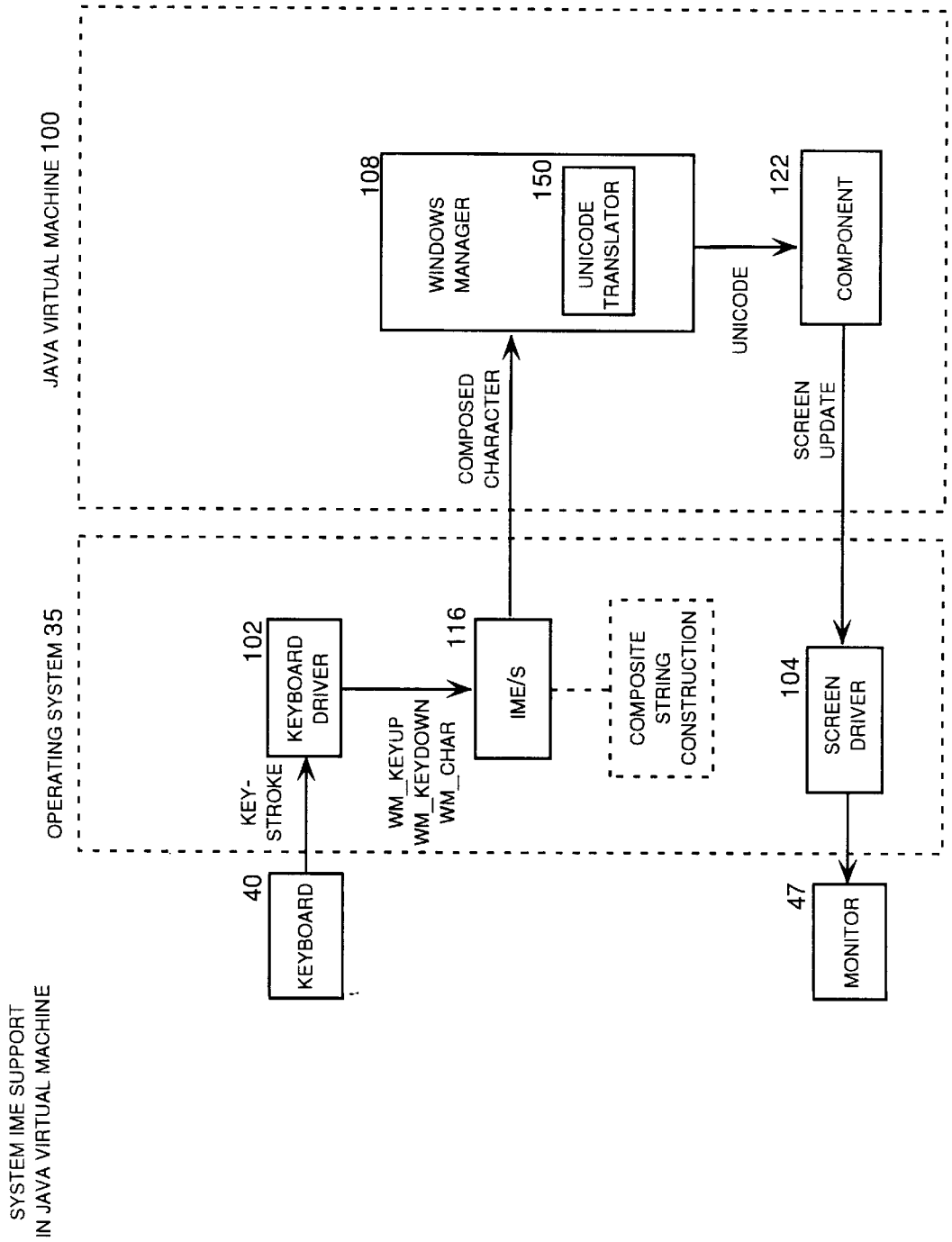
FIG. 11 is a schematic block diagram that illustrates a virtual machine supporting a system input method editor in accordance with an embodiment of the present invention.

FIG. 11 is a schematic block diagram that illustrates the virtual machine 100 supporting the system IME/S 116 in accordance with an embodiment of the present invention. The user depresses a key on the keyboard 40. The keyboard command is translated into keyboard commands by the keyboard driver 102. The keyboard driver 102 translates each keyboard command into the WM_KEYDOWN, WM_CHAR, and WM_KEYUP keyboard commands. The keyboard commands are passed to the system IME/S 116, which generates a composed character based on the keyboard commands.

The system IME/S 116 passes the composed character to the windows manager 108, which includes a Unicode translator that translates the composed character into Unicode format. The windows manager 108 passes the composed character in Unicode format to the component 122, which typically renders a user interface that allows the user to manipulate the composed character. The component 122 then passes a screen update to the screen driver 104, which drives the monitor 47.

Figure 12:
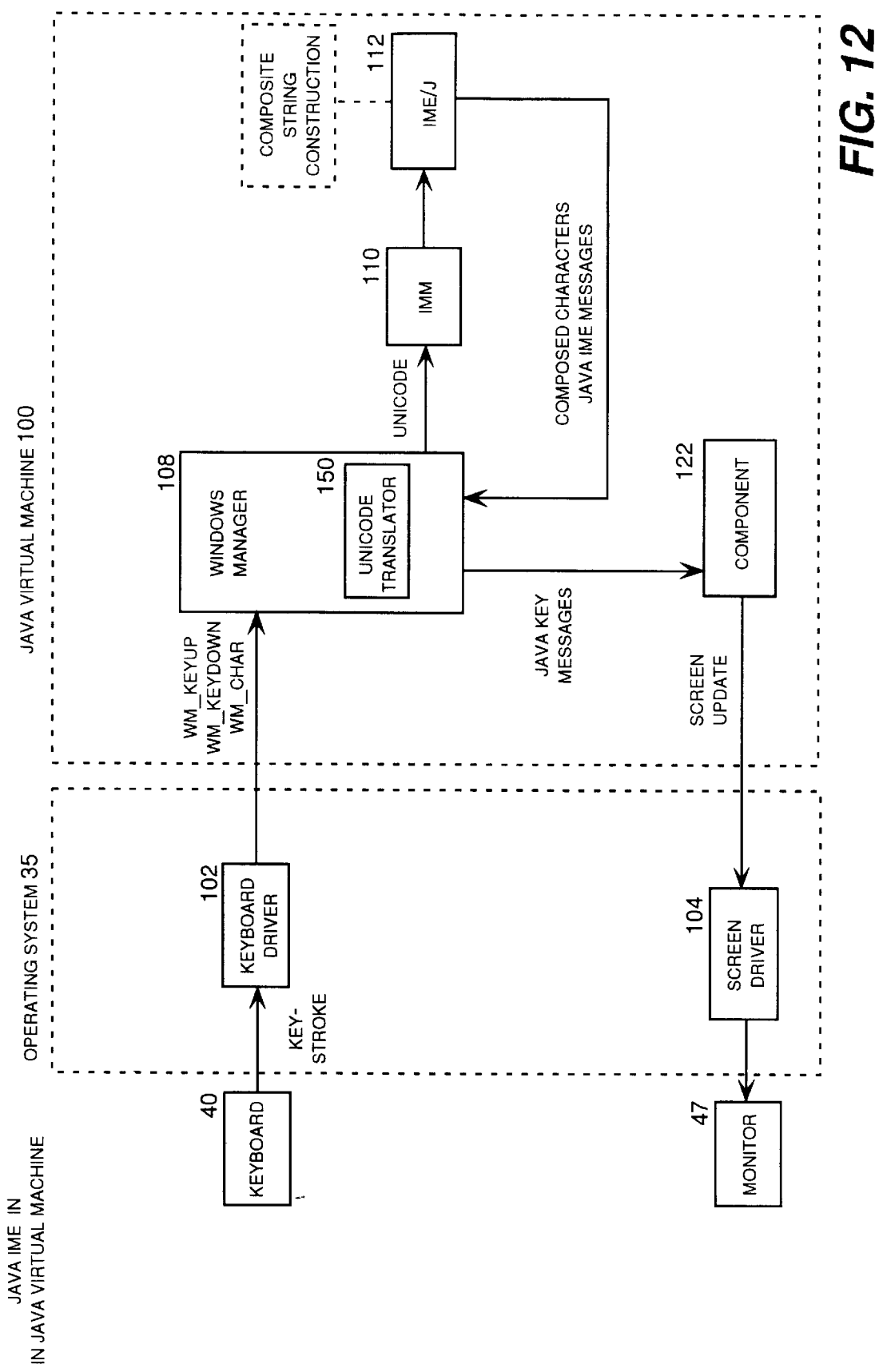
FIG. 12 is a schematic block diagram that illustrates a virtual machine implementing an input method editor in accordance with an embodiment of the present invention.

FIG. 12 is a schematic block diagram that illustrates the virtual machine 100 implementing the JAVA-based IME/J 112 in accordance with an embodiment of the present invention. The user depresses a key on the keyboard 40. The keyboard command is translated into keyboard commands by the keyboard driver 102. The keyboard driver 102 translates each keyboard command into the WM_KEYDOWN, WM_CHAR, and WM_KEYUP keyboard commands. These keyboard commands are delivered to the windows manager 108 of the virtual machine 100.

The windows manager 108 includes a Unicode translator that translates the keyboard commands into Unicode format. The windows manager 108 passes the Unicode keyboard commands to the IMM 110. The IMM 110 passes the Unicode keyboard commands to the JAVA-based IME/J 112, which translates the Unicode keyboard commands into a composed character. The JAVA-based IME/J 112 passes the composed character back to the windows manager 108, which passes the composed character to the component 122. The component 122 typically renders a user interface that allows the user to manipulate the composed characters. The component 122 then passes a screen update to the screen driver 104, which drives the monitor 47.

Figure 13:
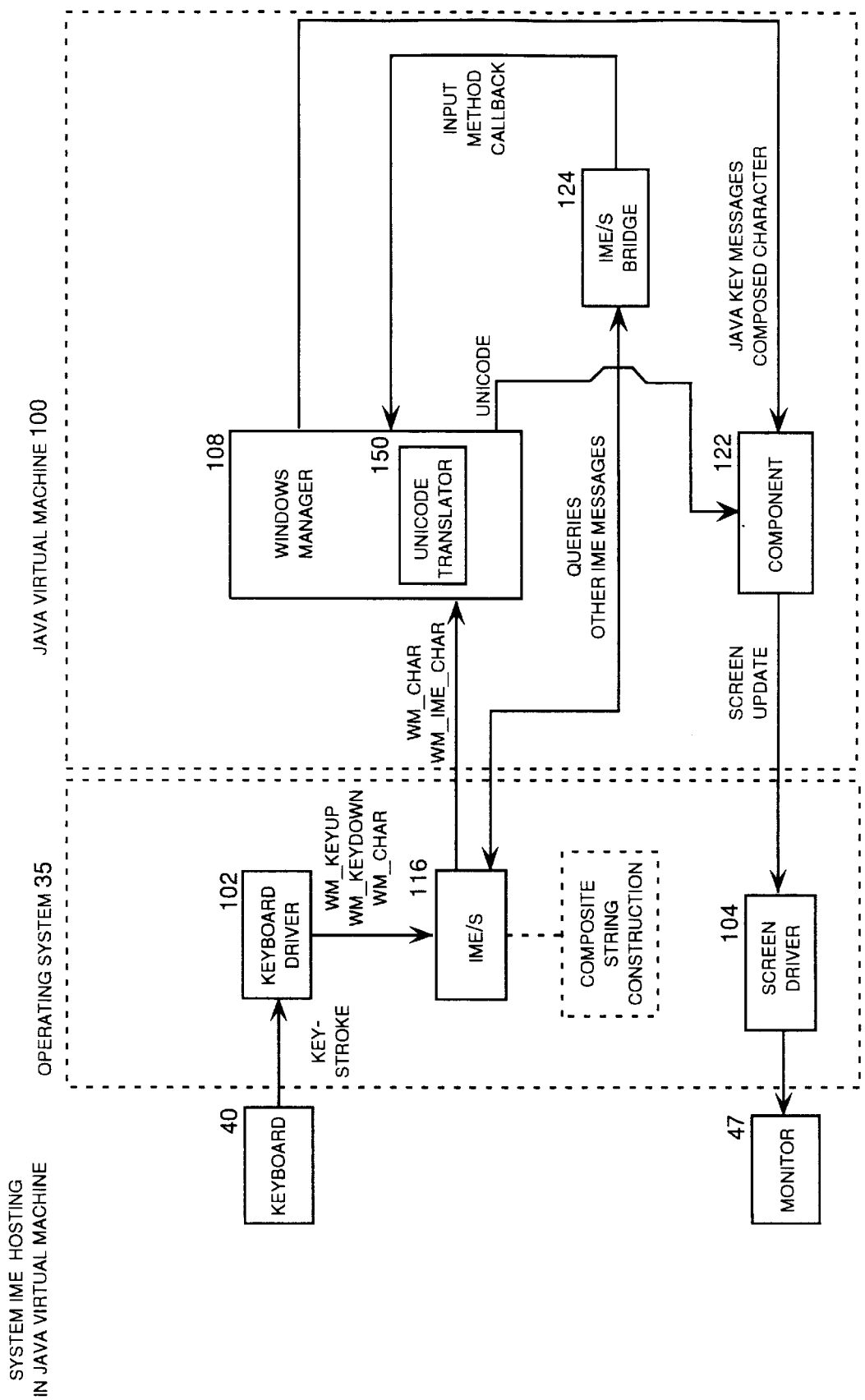
FIG. 13 is a schematic block diagram that illustrates a virtual machine hosting a system input method editor in accordance with an embodiment of the present invention.

FIG. 13 is a schematic block diagram that illustrates the virtual machine 100 hosting the system IME/S 116 in accordance with an embodiment of the present invention. The user depresses a key on the keyboard 40. The keyboard command is translated into keyboard commands by the keyboard driver 102, which is typically a module of the operating system 35. The keyboard driver 102 translates each keyboard command into the WM_KEYDOWN, WM_CHAR, and WM_KEYUP keyboard commands. These keyboard commands are delivered to the system IME/S 116, which may build multiple keyboard commands into a composite string including multiple WM_CHAR and WM_IME_CHAR keyboard commands.

The system IME/S 116 passes the composite string and system IME messages to the windows manager 108 of the virtual machine 100. The windows manager 108 includes a Unicode translator that translates the composite string from WM_IME_CHAR format into Unicode format. The windows manager 108 passes the Unicode composite string to the component 122. The system IME/S bridge 124 may also exchange queries and other system IME messages with the system IME/S 116. That is, the system IME/S 116 passes system IME messages to the system IME/S bridge 124 The system IME/S bridge translates these system IME messages into Input Method Message-derived messages and passes these messages back to the windows manager 108 by calling the HANDLE IME MESSAGE method 804 of the INPUT METHOD CALLBACK interface 800. The system IME/S bridge 124 the passes the composite string back to the windows manager 108, which passes the composed character to the component 122. The component 122 typically renders a user interface that allows the user to manipulate the composed characters. The component 122 then passes a screen update to the screen driver 104, which drives the monitor 47.

In view of the foregoing, it will be appreciated that the present invention provides a JAVA virtual machine that may be used to alter or augment the source code for IMEs on an as-needed basis. The present invention also defines a controlling interface for creating a JAVA-compatible IME. A JAVA-based virtual machine according to the present invention supports input method editor (IME) functionality in three contexts: (1) using JAVA-based IMEs with a JAVA virtual machine; (2) writing JAVA-based IMEs; and (3) integrating a JAVA virtual machine to system IMEs. The virtual machine includes a windows manager, an input method manager, one or more IMEs and/or KBDs, and a component. The component typically renders a user interface that allows the user to manipulate the composed characters returned by the IME. The virtual machine may also include an IME bridge for integrating the virtual machine with a system IME. The windows manager serves as a gateway between the operating system and the virtual machine. The input method manager (IMM) serves as a router between the windows manager and a plurality of IMEs and KBDs. The IME includes a look-up table of composed characters that are indexed by Unicode keyboard commands.

It should be understood that the foregoing relates only to specific embodiments of the present invention, and that numerous changes may be made therein without departing from the spirit and scope of the invention as defined by the following claims.

What is claimed is:

1. In or for a computer system comprising a processing unit, a keyboard coupled to the processing unit, a display device coupled to the processing unit, an operating system running on the processing unit, and a system input method editor running on the processing unit and programmed to communicate directly with the operating system, a platform-portable virtual machine running on the processing unit, comprising:

a windows manager operative for receiving keyboard commands from the operating system;

an input method manager for receiving the keyboard commands from the windows manager;

an input method editor operative for receiving the keyboard commands from the input method manager and translating the keyboard commands into a composed character;

a component operative for receiving the composed character from the input method editor and rendering the composed character for display on the display device; and an input method editor bridge operative for integrating the system input method editor with the virtual machine, and preventing undesirable feedback between the system input method editor and the operating system.

2. The virtual machine of claim 1, wherein the windows manager is operative for:

receiving the keyboard command from the keyboard;

determining whether the input method manager is active;

if the input method manager is not active, passing the keyboard command to the component; and if the input method manager is active, passing the keyboard command to the input method manager, receiving a return message from the input method manager and, if the return message is a false return message, passing the keyboard command to the component.

3. The virtual machine of claim 1, wherein the input method manager is operative for:

receiving the keyboard command from the windows manager;

determining whether the keyboard command is directed to the input method manager;

if the keyboard command is directed to the input method manager responding to the keyboard command; and if the keyboard command is not directed to the input method manager, passing the keyboard command to the input method editor.

4. The virtual machine of claim 1, wherein the input method editor is operative for:

receiving the keyboard command from the input method manager;

combining the keyboard command with previously received keyboard commands to create a composite string;

determining whether the composite string corresponds to the composed character; and if the composite string corresponds to the composed character, translating the composite string into the composed character, and passing the composed character to the windows manager.

5. The virtual machine of claim 1, wherein the windows manager is further operative for:

receiving the composed character from the input method editor; and passing the composed character to the component.

6. The virtual machine of claim 1, wherein the component is operative for:

receiving the composed character from the windows manager;

rendering a user interface on the display device; and rendering the composed character on the display device in association with the user interface.

7. The virtual machine of claim 1, wherein the component is further operative for:

after rendering the composed character on the display device in association with the user interface, receiving user commands through the user interface, altering the composed character in response to the user commands, and rendering the altered composed character on the display device in association with the user interface.

8. The virtual machine of claim 1, wherein the step of responding to a keyboard command that is directed to the input method manager comprises the steps of:

inactivating the input method editor; and activating an alternative input method editor.

9. A computer-readable medium storing computer-executable instructions defining the virtual machine of claim 1.

10. The virtual machine of claim 1, wherein the input method editor defines an interface comprising:

a first interface method for receiving a message from the input method manager instructing the input method editor to handle a keyboard command;

a second interface method for receiving a message from the input method manager instructing the input method editor to activate;

a third interface method for receiving a message from the input method manager instructing the input method editor to deactivate; and a fourth interface method for receiving a message from the windows manager instructing the input method editor to handle the message.

11. The virtual machine of claim 10, wherein the interface defined by the input method editor further comprises a fifth interface method for receiving a message from the component instructing the input method editor to manipulate a user interface rendered by the input method editor and displayed on the display device.

12. The virtual machine of claim 10, wherein the interface defined by the input method editor further comprises:

a fifth interface method for receiving a message from the component instructing the input method editor to render a user interface for display on the display device;

a sixth interface method for receiving a message from the component defining the size of the user interface rendered by the input method editor for display on the display device; and a seventh interface method for receiving a message from the component defining the position of the user interface rendered by the input method editor for display on the display device.

13. The virtual machine of claim 1, wherein the input method manager defines an interface comprising:

a first interface method for receiving a message from the windows manager instructing the input method manager to activate a first input method editor;

a second interface method for receiving a message from the windows manager instructing the input method manager to remove a second input method editor from a registered list of input method editors;

a third interface method for receiving a message from the windows manager instructing the input method manager to identify an active input method editor;

a fourth interface method for receiving a message from the windows manager instructing the input method manager to enumerate the registered list of input method editors; and a fifth interface method for receiving a message from the windows manager asking the input method manager to handle a keyboard command.

14. The virtual machine of claim 1, wherein the windows manager defines an interface comprising an interface method for receiving messages from the input method editor.

15. The virtual machine of claim 1, wherein the component defines an interface comprising an interface method for receiving messages from the windows manager.

16. In or for a computer system comprising a processing unit, a keyboard coupled to the processing unit, a display device coupled to the processing unit, an operating system running on the processing unit, and a system input method editor running on the processing unit and programmed to communicate directly with the operating system, a platform-portable virtual machine running on the processing unit, comprising:

an input method editor bridge operative for integrating the system input method editor with the virtual machine, and preventing undesirable feedback between the system input method editor and the operating system;

a windows manager operative for, receiving a keyboard command from the keyboard, determining whether an input method manager is active, if the input method manager is not active, passing the keyboard command to a component, and if the input method manager is active, passing the keyboard command to the input method manager, receiving a return message from the input method manager, and if the return message is a false return message, passing the keyboard command to the component;

the input method manager operative for, receiving the keyboard command from the windows manager, and determining whether the keyboard command is directed to the input method manager, if the keyboard command is directed to the input method manager responding to the keyboard command, and if the keyboard command is not directed to the input method manager, passing the keyboard command to the system input method editor by way of the input method editor bridge;

the system input method editor operative for receiving the keyboard command from the input method manager, combining the keyboard command with previously received keyboard commands to create a composite string, determining whether the composite string corresponds to a composed character, and if the composite string corresponds to the composed character, translating the composite string into the composed character, and passing the composed character to the windows manager;

the windows manager further operative for, receiving the composed character from the system input method editor, and passing the composed character to the component;

the component operative for, receiving the composed character from the windows manager, rendering a user interface on the display device, and rendering the composed character on the display device in association with the user interface.

17. The virtual machine of claim 16, wherein the step of responding to a keyboard command that is directed to the input method manager comprises the steps of:

inactivating the input method editor; and activating an alternative input method editor.

18. A computer-readable medium storing computer-executable instructions defining the virtual machine of claim 16.

19. The virtual machine of claim 16, wherein the input method editor defines an interface comprising;

a first interface method for receiving a message from the input method manager instructing the input method editor to handle a keyboard command;

a second interface method for receiving a message from the input method manager instructing the input method editor to activate;

a third interface method for receiving a message from the input method manager instructing the input method editor to deactivate;

a fourth interface method for receiving a message from the windows manager instructing the input method editor to handle the message;

a fifth interface method for receiving a message from the component instructing the input method editor to render a user interface for display on the display device;

a sixth interface method for receiving a message from the component defining the size of the user interface rendered by the input method for display on the display device; and a seventh interface method for receiving a message from the component defining the position of the user interface rendered by the input method for display on the display device.

20. The virtual machine of claim 16, wherein the input method manager defines an interface comprising:

a first interface method for receiving a message from the windows manager instructing the input method manager to activate a first input method editor;

a second interface method for receiving a message from the windows manager instructing the input method manager to deactivate a second input method editor;

a third interface method for receiving a message from the windows manager instructing the input method manager to identify an active input method editor; and a fourth interface method for receiving a message from the windows manager instructing the input method manager to handle a keyboard command.

21. The virtual machine of claim 20, wherein the interface defined by the input method manager further comprises a fifth interface method for receiving a message from the windows manager instructing the input method manager to enumerate a list of input method editors registered with the input method manager.

22. The virtual machine of claim 21, wherein the windows manager comprises an interface comprising an interface method for receiving messages from the input method editor.

23. The virtual machine of claim 22, wherein the component defines an interface comprising an interface method for receiving messages from the windows manager.

* * * * *